US009545607B1

(12) United States Patent
Thompson

(10) Patent No.: US 9,545,607 B1
(45) Date of Patent: Jan. 17, 2017

(54) DRY FORMULA MIXING APPARATUS AND METHOD OF USE

(71) Applicant: Marcie Thompson, Vero Beach, FL (US)

(72) Inventor: Marcie Thompson, Vero Beach, FL (US)

(*) Notice: Subject to any disclaimer, the term of this patent is extended or adjusted under 35 U.S.C. 154(b) by 146 days.

(21) Appl. No.: 14/494,679

(22) Filed: Sep. 24, 2014

Related U.S. Application Data

(63) Continuation-in-part of application No. 13/705,307, filed on Dec. 5, 2012, now abandoned.

(60) Provisional application No. 61/567,172, filed on Dec. 6, 2011.

(51) Int. Cl.
*B65D 81/32* (2006.01)
*B01F 13/00* (2006.01)
*B01F 3/12* (2006.01)
*A23L 1/29* (2006.01)
*B65D 51/28* (2006.01)

(52) U.S. Cl.
CPC ............ *B01F 13/0022* (2013.01); *A23L 1/296* (2013.01); *B01F 3/12* (2013.01); *B65D 51/2878* (2013.01); *B65D 81/3216* (2013.01); *A23V 2002/00* (2013.01); *B01F 2215/0014* (2013.01)

(58) Field of Classification Search
CPC ............ B01F 13/0022; B65D 51/2878; B65D 51/2857; B65D 51/2807; A61J 1/2093
USPC ........................................................ 366/130
See application file for complete search history.

(56) References Cited

U.S. PATENT DOCUMENTS

| 2,494,456 A * | 1/1950 | Still ...................... B65D 1/04 206/219 |
| 2,740,575 A * | 4/1956 | Fontaine ................ B65D 3/24 229/103.1 |
| 2,900,100 A * | 8/1959 | Debat ................ B65D 81/3222 206/219 |
| 3,275,180 A * | 9/1966 | Optner ............... B65D 77/0493 206/459.5 |
| 3,318,483 A * | 5/1967 | Modderno ......... B65D 81/3216 222/136 |
| 3,347,403 A * | 10/1967 | Lehrman ............. A47J 41/0072 220/23.87 |
| 3,402,855 A * | 9/1968 | Schroeder .......... B65D 81/3222 220/277 |

(Continued)

FOREIGN PATENT DOCUMENTS

| FR | 1564038 A * | 4/1969 | ............. B65D 81/32 |
| GB | 752750 A * | 7/1956 | ......... B65D 51/2857 |

(Continued)

*Primary Examiner* — Charles Cooley
(74) *Attorney, Agent, or Firm* — Glenn E. Gold; Glenn E. Gold, P.A.

(57) ABSTRACT

A dry powder and liquid mixing apparatus provides a dry powder container integratable with a liquid container, and a lid engaging both the dry powder container and the liquid container to enable selectable storage and mixing of powder and liquid, such as mixing dry infant formula with water. Through simple manual twisting of the lid about the liquid container to a closed state, a user is able to selectively prevent mixing of stored dry powder and liquid. Likewise, through simple manual twisting of the lid about the liquid container to an opened state, a user is able to selectively enable mixing of the dry powder with the liquid, by shaking the apparatus while the lid is in an opened state, resulting in a consumable mixed formula.

17 Claims, 13 Drawing Sheets

(56) References Cited

U.S. PATENT DOCUMENTS

| | | | | |
|---|---|---|---|---|
| 3,458,076 | A * | 7/1969 | Babcock | B65D 47/06 206/221 |
| 3,459,295 | A * | 8/1969 | Cousar | B65D 81/3216 206/219 |
| 3,494,143 | A * | 2/1970 | Barnett | B65D 17/165 126/262 |
| 3,613,955 | A * | 10/1971 | Wetherell, Jr. | B65D 51/20 206/222 |
| 3,802,056 | A * | 4/1974 | Jaeger | B21D 51/26 29/422 |
| 3,856,138 | A * | 12/1974 | Maekawa | B65D 81/3222 206/221 |
| 4,410,085 | A * | 10/1983 | Beneziat | B65D 81/3216 206/217 |
| 4,982,875 | A * | 1/1991 | Pozzi | B65D 81/3222 222/129 |
| 5,209,909 | A * | 5/1993 | Siegel | A01N 25/34 206/219 |
| 5,215,214 | A * | 6/1993 | Lev | B65D 81/3222 220/502 |
| 5,950,689 | A * | 9/1999 | Varlet | A61J 1/2093 141/2 |
| 5,980,834 | A * | 11/1999 | Bruno | B01L 3/502 239/34 |
| 6,059,443 | A * | 5/2000 | Casey | A45F 3/16 206/219 |
| 2005/0167296 | A1* | 8/2005 | Shenkar | B65D 81/3222 206/219 |
| 2005/0173271 | A1* | 8/2005 | Levi | B65D 81/3222 206/219 |
| 2006/0102581 | A1* | 5/2006 | Yates, III | B65D 81/3216 215/6 |
| 2009/0127274 | A1* | 5/2009 | Mueller | B65D 51/2864 220/789 |
| 2015/0360248 | A1* | 12/2015 | Camilleri | B01F 15/00512 206/221 |
| 2016/0280446 | A1* | 9/2016 | Casey | B65D 81/3222 |

FOREIGN PATENT DOCUMENTS

| | | | | |
|---|---|---|---|---|
| WO | WO 2011030280 A1 * | 3/2011 | | A61J 1/2093 |
| WO | WO 2015061711 A1 * | 4/2015 | | A61J 1/05 |
| WO | WO 2015149126 A1 * | 10/2015 | | B65D 81/3222 |

* cited by examiner

DRY FORMULA MIXING APPARATUS AND METHOD OF USE

CROSS-REFERENCE TO RELATED APPLICATION

This U.S. non-provisional utility patent application is a continuation-in-part (CIP) of co-pending U.S. non-provisional utility patent application number Ser. No. 13/705,307, filed on Dec. 5, 2012, which in turn claims the benefit of U.S. provisional patent application No. 61/567,172, filed on Dec. 6, 2011, both filed in the name of the same inventor, and both of which are incorporated-by-reference herein in their entireties.

FIELD OF THE INVENTION

The present disclosure generally relates to a combined storage container and mixing apparatus. More particularly, the present disclosure relates to a pair of cooperating containers having a sealable barrier therebetween, wherein the seal can be selectively temporarily breached to enable passage of ingredients contained within the cooperating containers therethrough to facilitate mixing of ingredients within the respective containers to produce a desired final composition.

BACKGROUND OF THE INVENTION

Many compositions are initially provided in two independent components until ready for consumption. For instance, this is the case with powered beverages, dry formula such as baby formula powder, cereals, and a host of other consumable products. Typically, the final consumable product is initially provided as two distinct and independent components; namely, a dry or powdered mixture and a liquid. Oftentimes, as is the case with baby formula, it is desirable or necessary, to mix a dry (e.g., powdered) formula with a liquid base (e.g., water) immediately prior to consuming them. While the present disclosure is primarily described and shown with the mixing of baby formula in mind, it will be obvious and clearly apparent to anyone that has ever had the need to mix specific measured quantities of individual components, that the present invention has a virtually endless array of applications.

The vast majority of known products for preparing infant formula are comprised of large, bulky, and often non-portable mixing devices. Large devices dictate that the mixing process be accomplished at the location of the device well ahead of the actual time of consumption. This has the disadvantage of making it difficult for a caretaker to travel far from the location of the mixing equipment. Other known products may provide some degree of portability, but oftentimes require a variety of individual components for containment of quantities of water and formula, precisely measuring respective amounts of water and formula, mixing the water and formula, and finally pouring or otherwise transferring the mixed end product into a bottle just prior to feeding.

As almost any new parent can attest to—particularly new mothers—for many months after bringing a newborn baby home from the hospital, sleep deprivation is a serious issue that commonly causes a lack of concentration and reduced decision-making skills. Sleep deprivation can become a very serious issue in the middle of the night, or any time for that matter, while preparing formula for a hungry infant in a complete stupor. How many times has a mother asker herself: "Did I add two or three scoops of formula into the water?" There are only two likely negative outcomes in this situation. A mother may take a chance and wind up feeding her baby a mixture containing an improper ratio of dry formula to water, potentially causing discomfort and possibly harm to her child. A more responsible mother is likely to choose the safe alternative—pouring out the entire mixture and starting over. This results in serious waste of a very expensive food product, not to mention a longer waiting period for a hungry and irritable infant.

In view of the above drawbacks, disadvantage and limitations of existing formula mixing products and the growing need for new parents to travel with infant children in an increasingly mobile society, there has never been a greater demand for a highly portable, safe, efficient, easy-to-use, formula storage and mixing apparatus. It would be highly desirable to provide such an apparatus that integrates all of the necessary functions heretofore performed using a variety of discrete products, into a portable multi-functional ready on demand unit resulting in a final formula composition ready to be directly transferred into a baby bottle. Furthermore, it would be beneficial to provide such an apparatus that takes the guesswork out of the water and formula measurement process, enabling consistent/repeatable highly accurate mixing ratios, all but eliminating the occurrence of improper formula preparation, Preferably, the apparatus would be constructed in a cost-effective manner using safe materials that eliminate any seepage of harmful chemicals into the stored ingredients.

SUMMARY OF THE INVENTION

Generally, the present invention provides two implementations of a portable dry formula mixing apparatus. In accordance with a first implementation, a dry formula mixing apparatus includes two ingredient containment sections, each comprising a delivery orifice and a repositionable seal. The seal retains the ingredients in the separate containment sections until use, when the seal is repositioned and the ingredients are subsequently mixed together for consumption.

A first implementation of the present invention provides a dry formula mixing apparatus comprising:
  a base container including:
    a base container tubular sidewall comprising a base container lower edge and a base container upper rim,
    a base container bottom comprising a base container peripheral edge, wherein the base container peripheral edge is contiguous with the base container lower sidewall edge providing a base volume containment;
  a mixing container including:
    a mixing container tubular sidewall having a mixing container lower edge and a mixing container upper rim,
    a mixing container bottom comprising a peripheral edge, the mixing container peripheral edge being contiguous about the mixing container lower sidewall edge providing a second volume containment,
    at least one base ingredient delivery orifice provided through the mixing container bottom,
    a repositionable seal providing a temporary closure of each of the at least one base ingredient delivery orifice, and
    an actuator in mechanical communication with the repositionable seal enabling a user to operate the repositionable seal; and a container cap comprising:
    a cap upper segment defined by a peripheral edge, and a cap attachment feature disposed about the cap peripheral edge;

wherein in operation, the user would place a first ingredient within the base volume containment and a second ingredient within the mixing volume containment, the mixing container is positioned into the base volume containment region where the mixing container tubular sidewall seals against the base container tubular sidewall entrapping the first ingredient within the base volume containment region, the cap peripheral edge is engaged with the mixing container upper rim entrapping the second ingredient within the second volume containment; and the first ingredient is mixed with the second ingredient by operating the repositionable seal enabling passage of the second ingredient through the at least one base ingredient delivery orifice into the first volume containment.

In an aspect, repositionable seal is a rotational repositionable seal, the rotational repositionable seal comprises at least one rotary seal delivery orifice.

In another aspect, the rotational repositionable seal is actuated by a rotational actuation motion.

In another aspect, the rotational repositionable seal further comprises a biasing member to return the rotational repositionable seal to a sealed configuration from a dispensing configuration.

In another aspect, a rotation of the rotational repositionable seal is parallel to the mixing container bottom, wherein the axis of rotation is perpendicular to a plane defined by the mixing container bottom.

In another aspect, the rotational repositionable seal can further comprise a gasket provided between a lower surface of the repositionable seal and an upper surface of the mixing container bottom.

In another aspect, the dry mixing apparatus further comprises a pivotal repositionable seal, the pivotal repositionable seal comprises at least one pivotal seal mechanism.

In another aspect, a pivotal motion of the at least one pivotal seal mechanism is angular respective to the mixing container bottom, wherein an axis of rotation is parallel to a plane defined by the mixing container bottom.

In another aspect, the pivotal repositionable seal is actuated by a linear actuation motion.

In another aspect, the pivotal repositionable seal further comprises a biasing member to return the pivotal repositionable seal to a sealed configuration from a dispensing configuration.

In another aspect, a peripheral edge of each of the at least one pivotal seal mechanisms further comprises an angled shape.

In another aspect, the repositionable seal is removably assembled to the mixing container to aid in cleaning.

In another aspect, the dry formula mixing apparatus may comprise:
  a base container including:
    a base container tubular sidewall comprising a base container lower edge and a base container upper rim,
    a base container bottom comprising a base container peripheral edge, wherein the base container peripheral edge is contiguous with the base container lower sidewall edge providing a base volume containment;
  a mixing container including:
    a mixing container tubular sidewall having a mixing container lower edge and a mixing container upper rim,
    a mixing container bottom comprising a peripheral edge, the mixing container peripheral edge being contiguous about the mixing container lower sidewall edge providing a second volume containment,
  a rotational repositionable seal comprising a base seal member disposed below a rotary seal member that is rotationally coupled to the base seal member, wherein the base seal member comprises at least one of a base ingredient delivery orifice and the rotary seal member comprises at least one of a rotary seal delivery orifice and wherein the at least one rotary seal orifice is sized, shaped, and located respective to the at least one base ingredient deliver orifice such that, in a dispensing configuration, the at least one rotary seal deliver orifice is located above the at least one base ingredient delivery orifice, defining a delivery path for transferring a second ingredient from the mixing container to the base container and, in a sealed configuration, the at least one rotary seal delivery orifice is located above a solid portion of the base seal member, defining a temporary seal of the delivery path, and
  an actuator in mechanical communication with the rotational repositionable seal enabling a user to operate the rotational repositionable seal; and a container cap comprising:
    a cap upper segment defined by a peripheral edge; and
    a cap attachment feature disposed about the cap peripheral edge, wherein, in operation, the user would place a first ingredient within the base volume containment and the second ingredient within the mixing volume containment, the mixing container is positioned into the base volume containment region where the mixing container tubular sidewall seals against the base container tubular sidewall entrapping the first ingredient within the base volume containment region, the cap peripheral edge is engaged with the mixing container upper rim entrapping the second ingredient within the second volume containment; and the first ingredient is mixed with the second ingredient by operating the rotational repositionable seal enabling passage of the second ingredient through the at least one base ingredient delivery orifice into the first volume containment.

In another aspect, the rotary seal member may be a planar disc.

In another aspect, the rotational repositionable seal further comprises a biasing member to return the rotational repositionable seal to the sealed configuration from the dispensing configuration.

In another aspect, a rotation of the rotational repositionable seal is parallel to the mixing container bottom, wherein the axis of rotation is perpendicular to a plane defined by the mixing container bottom.

In another aspect, the rotational repositionable seal can further comprise a gasket provided between a lower surface of the repositionable seal and an upper surface of the mixing container bottom.

In another aspect, a dry formula mixing apparatus may comprise:
  a base container including:
    a base container tubular sidewall comprising a base container lower edge and a base container upper rim,
    a base container bottom comprising a base container peripheral edge, wherein the base container peripheral edge is contiguous with the base container lower sidewall edge providing a base volume containment;
  a mixing container including:
    a mixing container tubular sidewall having a mixing container lower edge and a mixing container upper rim, a mixing container bottom comprising a peripheral edge being contiguous about the mixing container lower sidewall edge defining a second volume containment and at least one delivery port edge defining a delivery port passing through the mixing container bottom, a pivotal repositionable seal comprising at least one pivotal seal mechanism pivotally coupled to the mixing container bottom, the pivotal seal mechanism comprising a pivotal mechanism sealing edge, wherein the pivotal mechanism sealing edge is sized, shaped, and located respective to the at least one delivery port edge such that, in a first pivot position, the pivotal seal mechanism is located sealing the delivery port and, in a second pivot position, the pivotal seal mechanism is pivoted upwards to a position where the pivotal seal mechanism is at least partially separated from the delivery port edge, defining a delivery path for transferring a second ingredient from the mixing container to the base container, and an actuator in mechanical communication with the pivotal repositionable seal enabling a user to operate the pivotal repositionable seal; and a container cap comprising:

a cap upper segment defined by a peripheral edge, and a cap attachment feature disposed about the cap peripheral edge;

wherein in operation, the user would place a first ingredient within the base volume containment and the second ingredient within the mixing volume containment, the mixing container is positioned into the base volume containment region where the mixing container tubular sidewall seals against the base container tubular sidewall entrapping the first ingredient within the base volume containment region, the cap peripheral edge is engaged with the mixing container upper rim entrapping the second ingredient within the second volume containment; and the first ingredient is mixed with the second ingredient by operating the pivotal repositionable seal enabling passage of the second ingredient through the at least one base ingredient delivery orifice into the first volume containment.

In yet another aspect, a pivotal motion of the at least one pivotal seal mechanism is angular respective to the mixing container bottom, wherein an axis of rotation is parallel to a plane defined by the mixing container bottom.

In yet another aspect, a peripheral edge of each of the at least one pivotal seal mechanisms further comprises an angled shape.

A second preferred implementation of the present invention provides a dry formula mixing apparatus, comprising:

a liquid container having an outer cylindrical sidewall and a spaced-apart inner cylindrical sidewall interconnected by, and contiguous with, an annular base, the contiguous inner and outer sidewalls and annular base defining a liquid container interior chamber adapted for receiving a volume of liquid, the liquid container outer sidewall having a thickened upper portion commencing at an outwardly extending flange, the flange transitioning upwardly into an externally threaded portion, and the externally threaded portion transitioning upwardly into an uppermost thickened portion terminating at an outer cylindrical sidewall upper edge, the uppermost thickened portion having a sealing member integrated therewith;

a stabilizing feature located within an interior space defined by an interior surface of the liquid container cylindrical inner sidewall;

a powder container having a cylindrical sidewall extending upward from, and contiguous with, a powder container base, the powder container in snug engagement with the stabilizing feature to aid in maintaining a preferred fixed position and orientation of the powder container within an interior space bounded by said liquid container inner sidewall, an upper length of the powder container having a thickened sidewall portion terminating at a flanged upper end, the flanged upper end supported upon an upper edge of the liquid container cylindrical inner sidewall, and an outer surface of the thickened sidewall portion incorporating a sealing member creating sealing engagement with an interior surface of the liquid container cylindrical inner sidewall; and a generally cylindrically-shaped lid having a top portion contiguous with a main lid sidewall depending downwardly from a perimeter thereof, the main lid sidewall having an upper sidewall portion transitioning into a wider lower sidewall portion, the lower sidewall portion terminating at a main lid sidewall lower edge and having an internally threaded surface for selective threading engagement with the externally threaded portion of the liquid container, a bottom interior surface of the top portion of the lid having a first inner cylindrical lid wall contiguous with, and depending downwardly from, said bottom interior lid surface, and the bottom interior surface of the top portion of the lid having a second inner cylindrical lid wall contiguous with, and extending downwardly from, said bottom interior lid surface, the first inner cylindrical lid wall inwardly offset from the upper portion of the main lid sidewall by a distance defining a gap therebetween, the gap sized and shaped for receiving said uppermost thickened portion of said liquid container outer sidewall therein for facilitating selective sealing engagement of an interior surface of the upper portion of the main lid sidewall and the sealing member integrated with the uppermost thickened portion of the liquid container outer sidewall, the second inner cylindrical lid wall inwardly offset from the first inner cylindrical lid wall and terminating at a second inner cylindrical wall lower edge, the lower edge incorporating a sealing member for providing selective sealing engagement with an upper surface of the powder container flange when said mixing apparatus is in a completely closed state.

In an aspect, the apparatus may incorporate a combination hand grip and carabiner extending medially upward from an upper surface of the lid.

In another aspect, the combination hand grip and carabiner may further comprise a vertical wall contiguous with said lid upper surface, said wall having an upper edge having a linear taper from a low point to a high point, said vertical wall having a carabiner aperture extending therethrough.

In another aspect, the lower sidewall portion of the lid may include hand grip enhancing indentations provided in an exterior surface thereof.

In another aspect, the stabilizing feature may be located proximate to a lower end of the liquid container and extend inwardly from an interior surface of said cylindrical inner wall.

In another aspect, the stabilizing feature may be a discrete component or, preferably, integrated into the liquid container. In either case, the stabilizer may comprise a stabilizer ring extending inwardly from an interior-facing surface of the liquid container inner sidewall, and incorporate a plurality of ring fins projecting inwardly therefrom.

In another aspect, the sealing member integrated with the uppermost thickened portion of said liquid container sidewall may further comprise a contiguous recess extending into and circumscribing an exterior surface of the uppermost thickened portion of said liquid container, and a resilient seal snugly seated within said contiguous recess, wherein the resilient seal isolates liquid within said liquid container interior chamber from egress outside of said apparatus regardless of whether said lid is in an open or closed state.

In another aspect, the sealing member incorporated into the outer surface of the thickened sidewall portion of the powder container may further include a contiguous recess extending into and circumscribing an outer surface of the thickened powder container sidewall portion, and a resilient seal snugly seated within the recess. Accordingly, it may function to prevent both liquid and dry powder from ingress into interior spaces between said liquid container and said dry powder container of said apparatus regardless of whether said lid is in an open or closed state.

In another aspect, the sealing member incorporated with the second inner cylindrical lid wall lower edge may further comprise a contiguous recess extending into and circumscribing an exterior surface of the second inner cylindrical lid wall, and a resilient seal snugly seated within the contiguous recess, wherein the resilient seal prevents egress of liquid contained within the liquid container and egress of powder contained within the powder container, while the lid is in a closed state, but facilitates egress of liquid contained within the liquid container and egress of powder contained within said powder container, thereby facilitating mixing of said liquid and said powder while said lid is in an opened state.

In a further aspect, the apparatus may further include highly visible liquid volume measurement level markings and corresponding indicia disposed upon an exterior surface of the outer sidewall of said liquid container.

In a further aspect, the apparatus may further include highly visible indicia in the form of a chart displaying a list of ratios of powder volume to liquid volume, disposed upon an exterior surface of the outer sidewall of the liquid container.

In a further aspect, the apparatus may include highly visible powder volume measurement level markings and corresponding indicia disposed upon an exterior surface of said sidewall of the powder container.

In a further aspect, the inner and outer sidewalls of the liquid container may diverge in an upward direction from the annular base.

In another aspect, when said apparatus is in a fully-assembled state, the outer sidewall of the liquid container, the sidewall of the powder container, and the sidewall of the lid may be constructed to be all concentric about a common central axis.

In another aspect, optionally the liquid container exterior threads and said lid interior threads may be configured such that clockwise rotation of the lid about the liquid container effects biasing of the apparatus into a closed state, and counter-clockwise rotation of the lid about said liquid container effects biasing of the apparatus into an opened state.

In another aspect, it is contemplated to integrate an indicator, which may be visible and/or audible, to provide a clear indication that the lid has been adequately rotated to ensure mixing communication between liquid in the liquid container and powder in the powder container.

In another aspect, an integral liquid container flange may be provided extending outwardly beyond the bottom/lower edge of the lid, thereby functioning as a mechanical stop to prevent excessive rotational tightening of said lid while closing.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
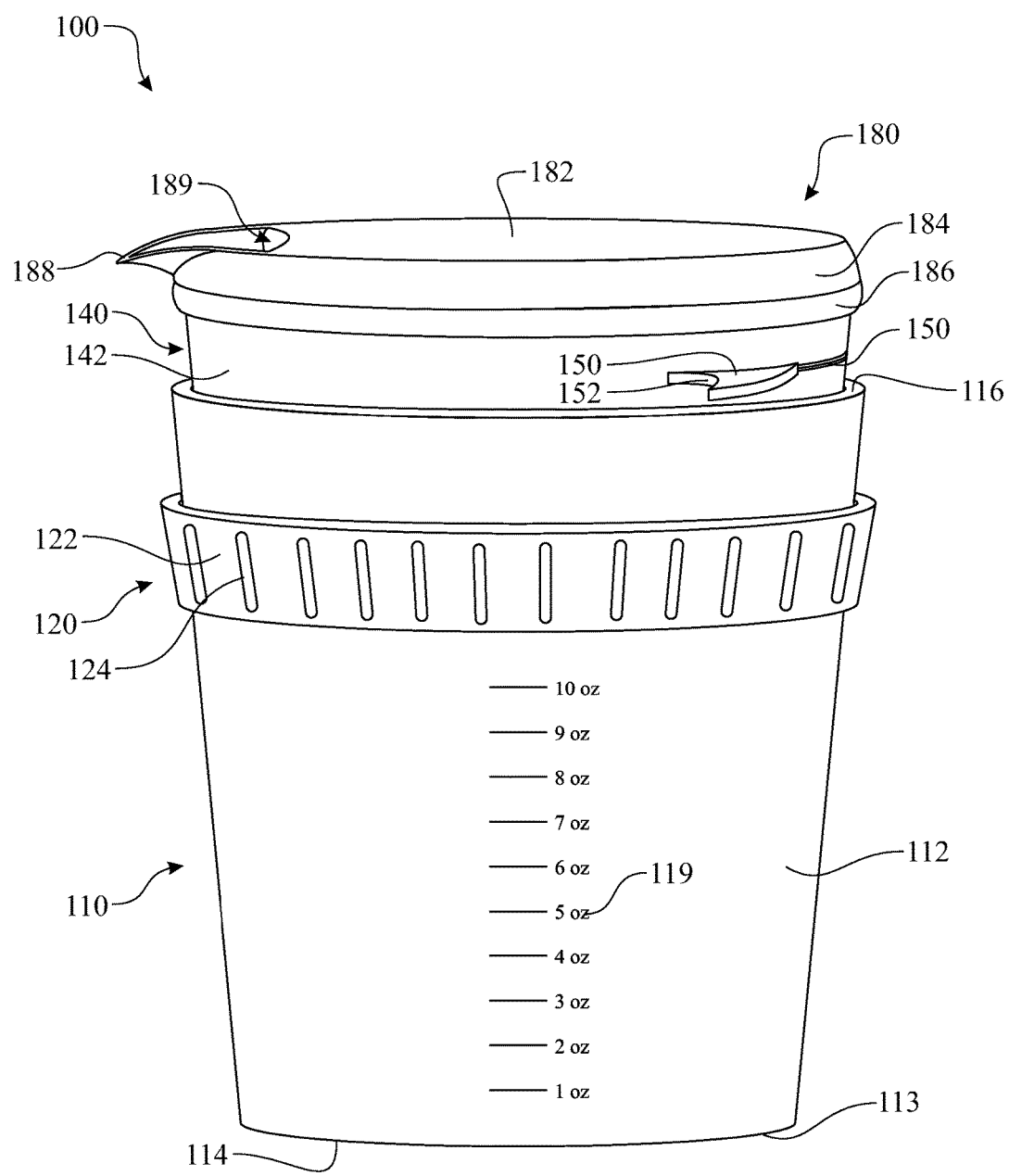
FIG. 1 presents an isometric view of an exemplary dry formula mixing apparatus illustrated in an assembled configuration, in accordance with a first embodiment.
Figure 2:
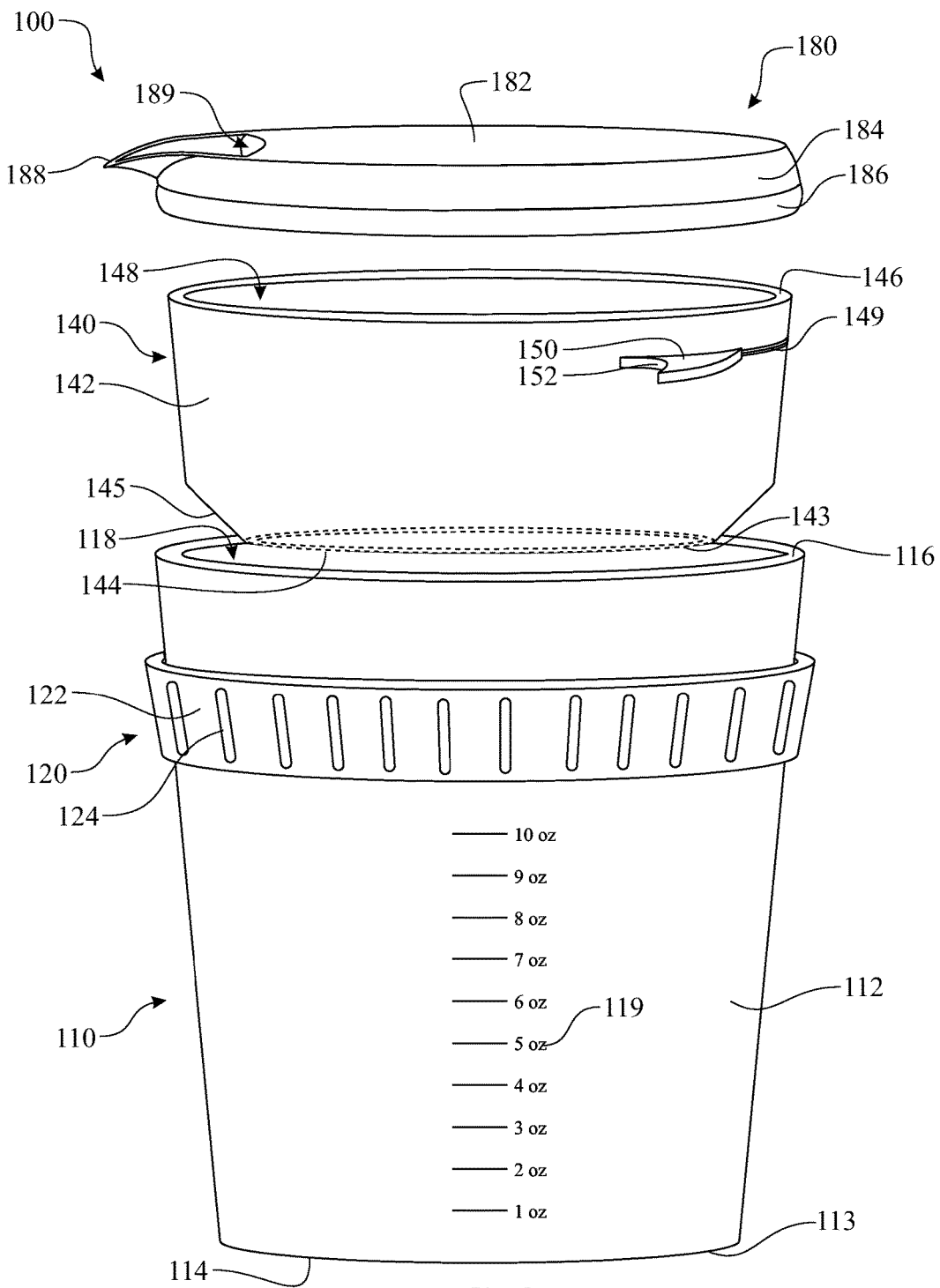
FIG. 2 presents an isometric view of the exemplary dry formula mixing apparatus introduced in FIG. 1, the illustration presenting the apparatus in an exploded assembly configuration.
Figure 3:
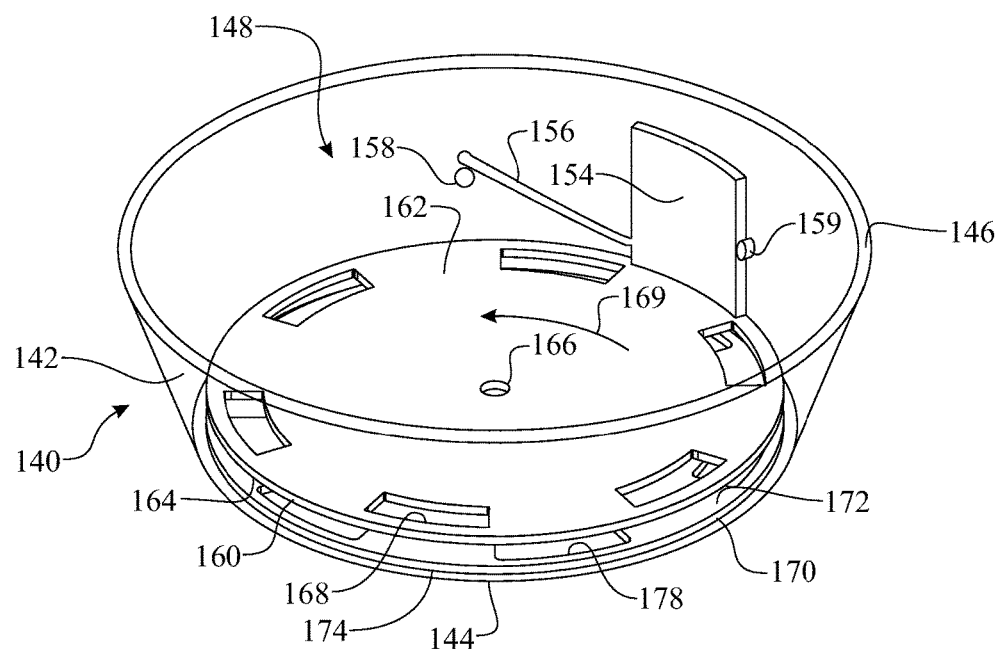
FIG. 3 presents an isometric view of a first exemplary mixing container portion of the exemplary dry formula mixing apparatus, wherein the mixing container is illustrated in a sealed configuration.
Figure 4:
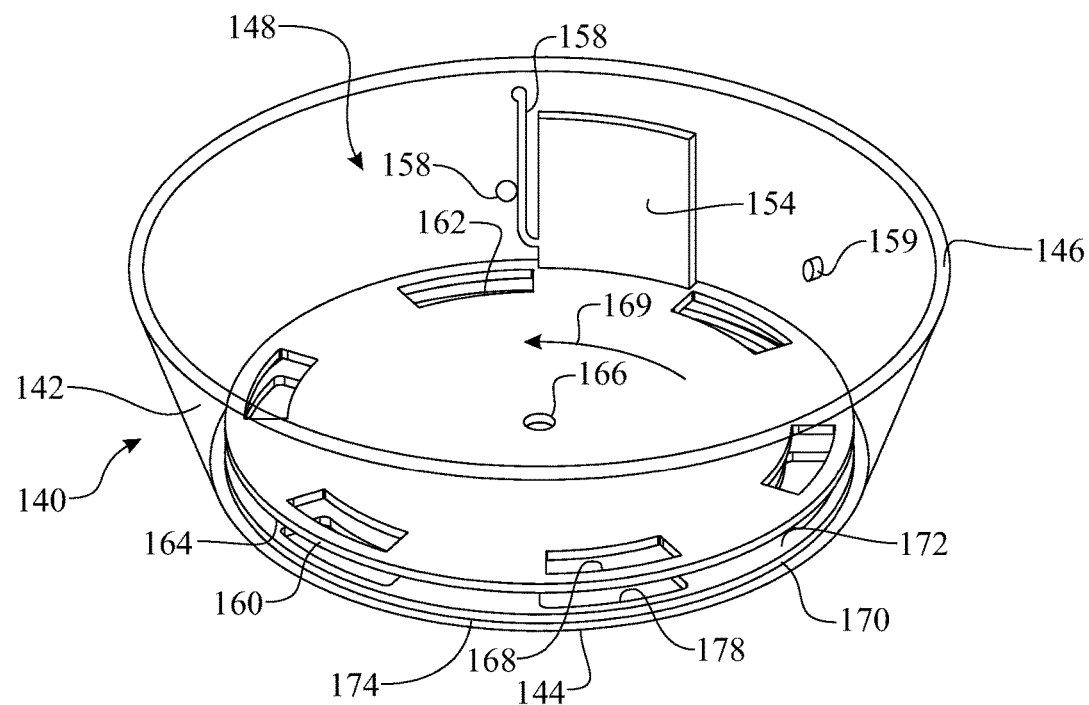
FIG. 4 presents an isometric view of the first exemplary mixing container portion of the exemplary dry formula mixing apparatus introduced in FIG. 3, wherein the mixing container is illustrated in a dispensing configuration.
Figure 5:
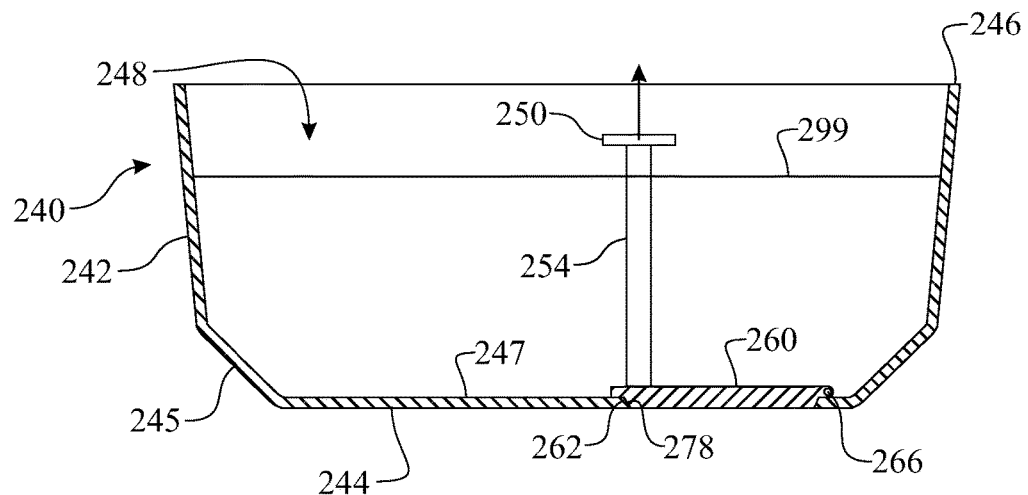
FIG. 5 presents a sectioned side view of a second exemplary mixing container portion of the exemplary dry formula mixing apparatus, wherein the mixing container is illustrated in a sealed configuration.
Figure 6:
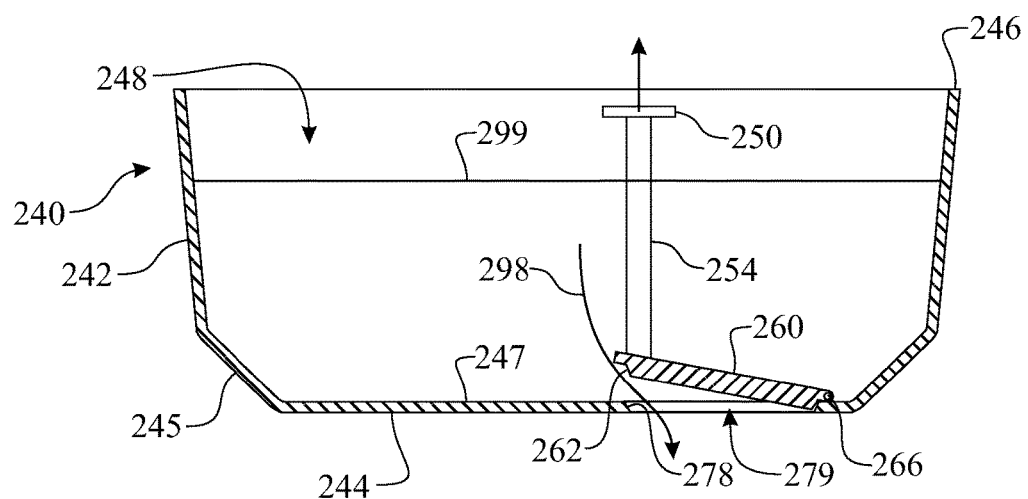
FIG. 6 presents an isometric view of the second exemplary mixing container portion of the exemplary dry formula mixing apparatus introduced in FIG. 5, wherein the mixing container is illustrated in a dispensing configuration.

In accordance with a first general implementation of the present invention, a dry formula mixing apparatus 100 is described herein and presented in representative FIGS. 1 and 2, with a first exemplary embodiment of a seal configuration being presented in FIGS. 3 and 4 and a second exemplary embodiment of a seal configuration being presented in FIGS. 5 and 6.

The dry formula mixing apparatus 100 includes a base container 110, a mixing container 140, and a delivery mechanism actuator 150. The base container 110 is preferably shaped adhering to commonly known cups, including a base container tubular sidewall 112 having a base container upper rim 116 disposed at a first end and a base sidewall lower edge 113 disposed at an opposite end. A base container bottom 114 is integrated into a bottom portion of the base container 110, wherein a peripheral edge of the base container bottom 114 is contiguous with the base sidewall lower edge 113 to form a base container receiving section 118 or a base volume containment region. The base container 110 can be enhanced with the inclusion of a base container grip subassembly 120. The base container grip subassembly 120 provides a grip to aid the user in grasping the base container 110. An exemplary base container grip subassembly 120 is shown circumscribing a portion of the exterior of the base container tubular sidewall 112. The exemplary base container grip subassembly 120 can include a series of grip ridges 124 disposed upon a grip body 122 in a spatial arrangement. The exemplary grip body 122 is shaped to adhere to the contour of the exterior of the base container tubular sidewall 112. In the exemplary embodiment, the base container tubular sidewall 112 is formed in an inverted frustum. The exemplary grip body 122 would therefore be shaped in a suitably dimensioned inverted frustum. It is understood that the base container grip subassembly 120 can be provided in any alternate embodiment while providing the same desired function.

The base container 110 can be fabricated of any reasonable material, including plastic, metal, waxed or other fluid retaining paper, and the like. The fabrication of the base container 110 would be accomplished using any reasonably known fabrication process, the process being determined based upon the selected material. The base container grip subassembly 120 can be fabricated of any reasonable material suitable for the desired function; the material options can include rubber, nylon, plastic, silicon, and the like. It is understood the function of the base container grip subassembly 120 can be integrated into the base container tubular sidewall 112 during the fabrication process of the base container 110, such as the inclusion of ribbed shapes, bosses, and the like.

The mixing container 140 is preferably shaped to nest within the base container receiving section 118 of the base container 110. The mixing container 140 includes a mixing container tubular sidewall 142 having a mixing container upper rim 146 disposed at a first end and a mixing container lower edge 143 disposed at an opposite end. A mixing container bottom 144 is integrated into a bottom portion of the mixing container 140, wherein a peripheral edge of the mixing container bottom 144 is contiguous with the mixing container lower edge 143 to form a mixing container receiving section 148 or a mixing volume containment region. The mixing container tubular sidewall 142 is shaped in an inverted frustum, and more specifically shaped and suitably dimensioned to engage with an interior surface of the base container tubular sidewall 112 in a manner to provide a reasonable seal therebetween. The mixing container tubular sidewall 142 can transition into a mixing container tubular sidewall lead in section 145 located proximate the mixing container lower edge 143, wherein the mixing container tubular sidewall lead in section 145 aids the user in inserting the mixing container 140 into the base container 110. The mixing container 140 further comprises at least one delivery orifice and an associated repositionable seal for temporarily sealing and subsequently providing passage through the respective delivery orifice. Details of exemplary embodiments of the delivery orifice and associated repositionable seal will be presented later in this disclosure.

The container cap 180 provides a seal to the base container 110 and/or the mixing container 140. The container cap 180 includes a cap upper segment 182 defined by a peripheral edge. A cap vertical segment 184 extends downward from the peripheral edge. A cap attachment feature 186 is integrated into a lower edge of the cap vertical segment 184 during the forming process. It is understood that there are certain benefits if the size and shape of the base container upper rim 116 and mixing container upper rim 146 were similar, such as enabling the container cap 180 to engage with either the base container upper rim 116 or the mixing container upper rim 146. A spout 188 can be integrated into the container cap 180. A spout orifice 189 would be integrated into the cap upper segment 182, wherein the spout orifice 189 is located within the spout 188. The spout orifice 189 provides a passageway for the transfer of the contents from within the base container receiving section 118 or mixing container receiving section 148 to another object such as a bottle, drinking cup, bowl, and the like. It is understood that the spout orifice 189 can include a sealing feature to retain the contents within the base container receiving section 118 or mixing container receiving section 148 until the user desires to dispense the contents therefrom. An exemplary sealing feature would be a flap provided against the spout orifice 189.

The delivery orifice and associated repositionable seal of the mixing container 140 can be provided in any reasonable form factor. A first exemplary embodiment is illustrated in a sealed configuration in FIG. 3 and a dispensing configuration shown in FIG. 4. The exemplary mixing container 140 includes a plurality of base ingredient delivery orifices 178 provided through a base seal member 170. It is understood that the base seal member 170 can be the mixing container bottom 144 or a separate element integrated into the mixing container 140. The base seal member 170 is defined having a base seal upper surface 172 and a base seal lower surface 174. A rotary seal 160 is rotationally coupled to the base seal member 170 by inserting an axial pin (not shown, but well understood) through a rotary seal pivot aperture 166 formed through a center of the rotary seal 160. The rotary seal 160 is preferably a planar disc comprising a plurality of rotary seal delivery orifices 168, wherein the rotary seal delivery orifices 168 are sized, shaped, and located respective to the plurality of base ingredient delivery orifices 178, whereby in a first rotated position, the rotary seal delivery orifice 168 is located over a solid portion of the base seal member 170 and the solid portion of the rotary seal 160 is located over a base ingredient delivery orifices 178. This configuration, in conjunction with gaskets or other sealing features, provides a fluid containing barrier or seal. The gaskets would be placed between a rotary seal lower surface 164 of the rotary seal 160 and the base seal upper surface 172 of the base seal member 170 or mixing container 140. The rotary seal 160 would be rotated in accordance with a rotary seal motion 169, using any reasonable interface to a position where the rotary seal delivery orifices 168 are at least partially overlapping the respective base ingredient delivery orifices 178. This configuration provides a pathway for transferring the contents of the mixing container 140 (referred to as second ingredient) into the base container 110, enabling mixture of the second ingredient with the contents of the base container 110 (referred to as first ingredient). The rotary seal 160 would be returned to a normally sealed configuration by a biasing element 156 integrated into the delivery mechanism actuator arm 154. The delivery mechanism actuator 150 extends outward from the delivery mechanism actuator arm 154, passing through a delivery mechanism actuator slot 149. The user operates the delivery mechanism actuator 150 by pressing upon a delivery mechanism actuator grip 152, which causes the delivery mechanism actuator 150 to move forward. A biasing element brace 158 is affixed to an interior surface of the mixing container tubular sidewall 142. The biasing element brace 158 acts against a biasing force generated by the biasing element brace 158 during the rotation 169 of the rotary seal 160 to provide a return force to the rotary seal 160 causing the rotary seal 160 to return to the normally sealed configuration. A rotary seal return stop 159 can be included to provide a repeatable locator to ensure the rotary seal 160 is rotated into the normally sealed configuration. The biasing configuration illustrated is only exemplary and it is understood that any biasing configuration can be integrated into the mixing container 140 to return the rotary seal 160 to the normally sealed configuration. It is understood that the illustrated embodiment of the rotary seal delivery orifices 168 and base ingredient delivery orifices 178 are only exemplary and the quantity, size, location and other design features of the rotary seal delivery orifices 168 and base ingredient delivery orifices 178 can vary based upon the designer's choice. Similarly the shape of the rotary seal 160 can vary as desired. One exemplary variance is the rotary seal upper surface 162 further comprising an angled surface, wherein the central portion is raised respective to the peripheral edge to aid in directing the contents towards the plurality of rotary seal delivery orifices 168.

In one exemplary application, an infant formula powder is stored in one of the mixing container 140 and the base container 110. Water is stored in the other container. The two ingredients are mixed together to create the infant formula.

In a second exemplary application, a dry cereal is stored in one of the mixing container 140 and the base container 110. Milk is stored in the other container. The two ingredients are mixed together prior to consumption. This enables the cereal to remain fresh until consumption.

A second exemplary embodiment, referred to as a mixing container 240, is illustrated in a sealed configuration in FIG. 5 and a dispensing configuration shown in FIG. 6. The mixing container 240 includes a number of elements similar to those of the mixing container 140, wherein like features of mixing container 240 and mixing container 140 are numbered the same except preceded by the numeral '2'.

The exemplary mixing container 240 includes at least one delivery port edge 278 defining a delivery port 279 passing through a mixing container bottom 244. The mixing container bottom 244 includes a bottom interior surface 247. A pivotal seal mechanism 260 is pivotally coupled to the mixing container bottom 244. The pivotal seal mechanism 260 is defined as a solid material comprising a pivotal mechanism sealing edge 262, wherein the pivotal mechanism sealing edge 262 is sized, shaped, and located respective to the at least one delivery port edge 278. The pivotal seal mechanism 260 is attached to the mixing container tubular sidewall 242 or mixing container bottom 244 using any pivotal interface. The exemplary embodiment presents a seal mechanism pivot member 266 as the pivotal interface. It is understood that any pivotal interface, including a living hinge, and the like can be employed by design. In a first pivot position (FIG. 5), the pivotal seal mechanism 260 is located sealing the delivery port 279. The pivotal seal mechanism 260 would be pivoted upwards into a second pivot position using any reasonable operational interface, to a position where the pivotal seal mechanism 260 is at least partially separated from the delivery port edge 278. This configuration provides a delivery path 298 for transferring the contents of the mixing container 240 (referred to as second ingredient) into the base container 110, enabling mixture of the second ingredient with the contents of the base container 110 (referred to as first ingredient). The pivotal seal mechanism 260 would be returned to a normally sealed configuration by a biasing element (not shown) integrated into the mixing container bottom 244 or pivotal seal mechanism 260.

An exemplary operational interface includes a delivery mechanism actuator arm 254 connecting a delivery mechanism actuator 250 and the pivotal seal mechanism 260 to one another. The delivery mechanism actuator 250 would preferably extend to an exterior of the mixing container tubular sidewall 242, providing easy access for operation by the end user. The end user would raise the delivery mechanism actuator 250, which in turn causes the pivotal seal mechanism 260 to pivot upwards, separating the seal mechanism pivot member 266 from the delivery port edge 278.

The pivotal mechanism sealing edge 262 of the pivotal seal mechanism 260 and/or the delivery port edge 278 is preferably angled to improve and ensure that a fluid seal is created between the pivotal seal mechanism 260 and the delivery port edge 278. Additionally, the angled interface surface enhances the pivotal motion.

The dry formula mixing apparatus 100 can include various features to aid in determining the volume of the contents placed within the base container 110 and mixing container 140, 240. Volume indicators 119 can be applied to an interior or exterior of the base container tubular sidewall 112. Similarly a marking such as maximum volume indicator 299 (FIGS. 5 and 6) can be applied to an interior or exterior of the base container tubular sidewall 112 and/or the mixing container tubular sidewall 142, 242.

Figure 7:
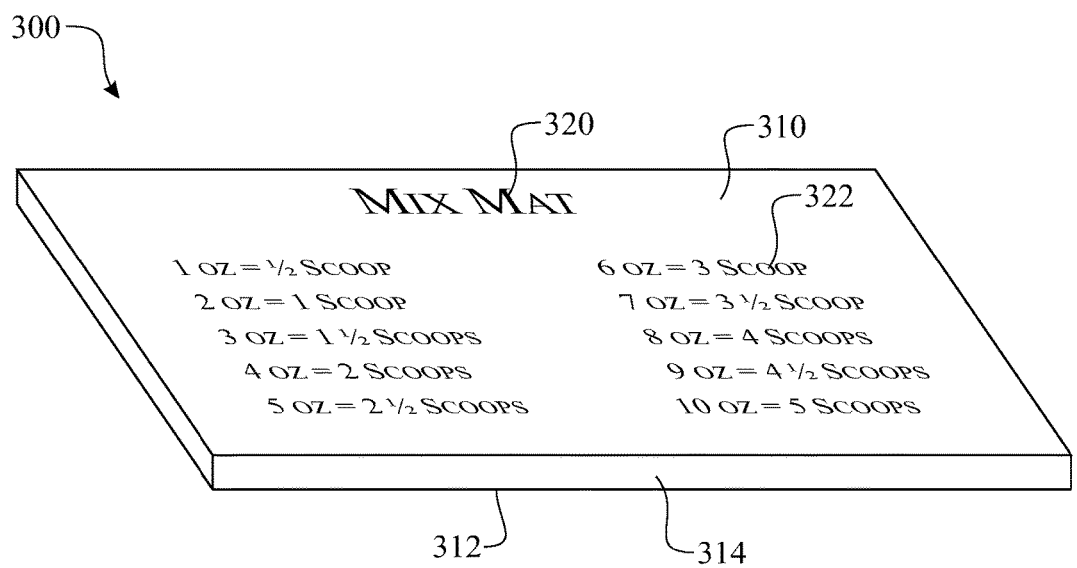
FIG. 7 presents an isometric view of an exemplary mixing mat.
Figure 8:
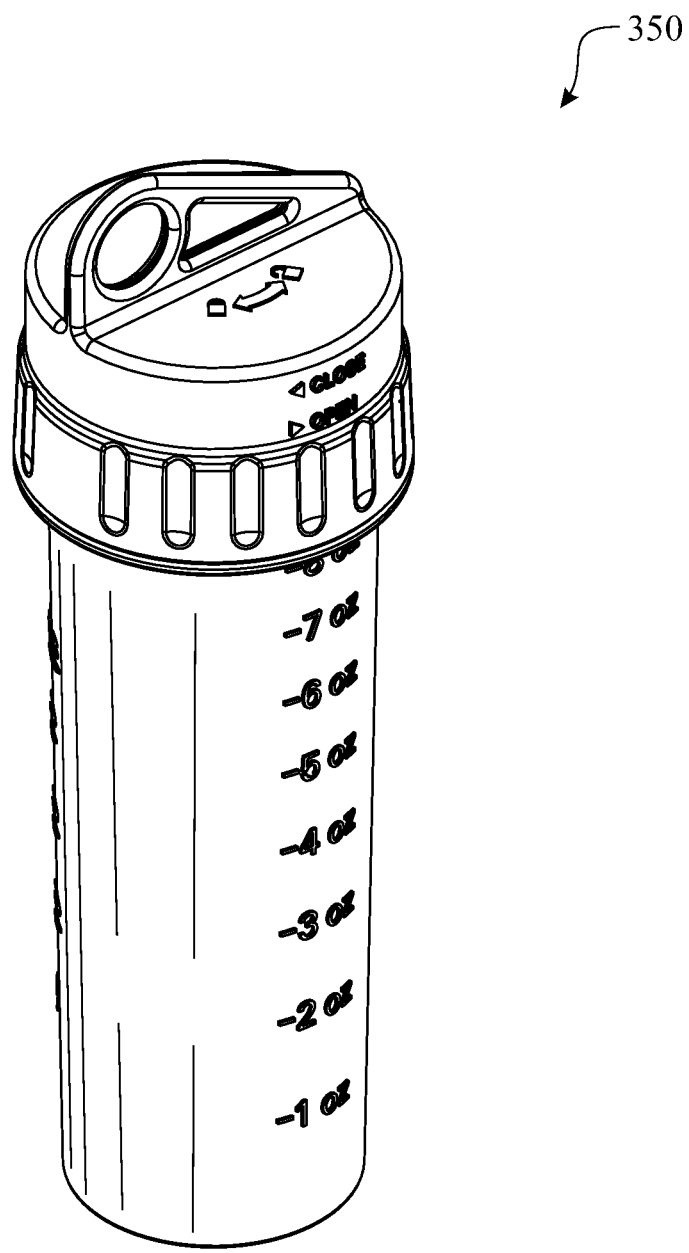
FIG. 8 presents an isometric view of an exemplary dry formula mixing apparatus illustrated in an assembled configuration, in accordance with a preferred second implementation.
Figure 9:
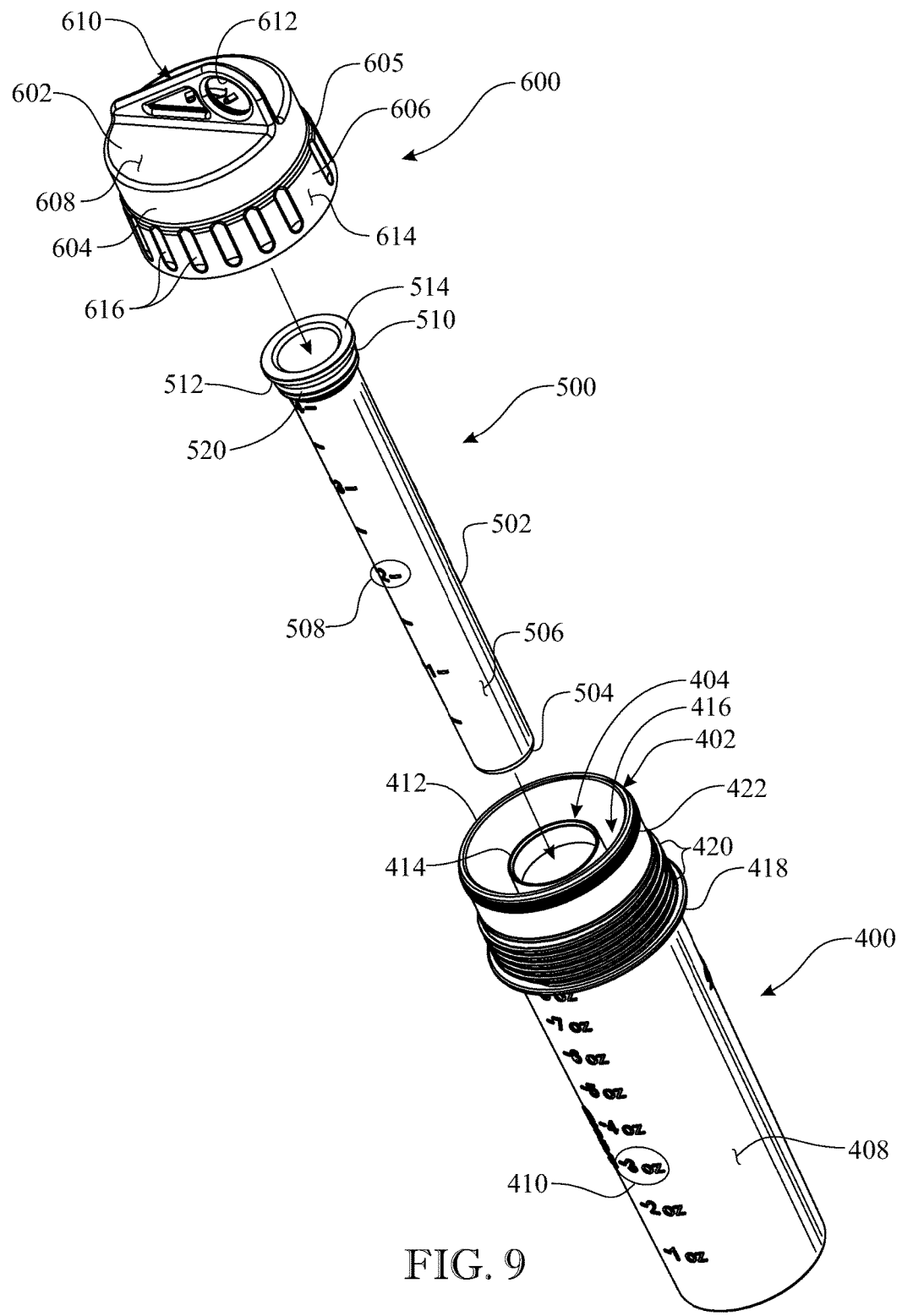
FIG. 9 presents a top isometric exploded view of the exemplary dry formula mixing apparatus introduced in FIG. 8.
Figure 10:
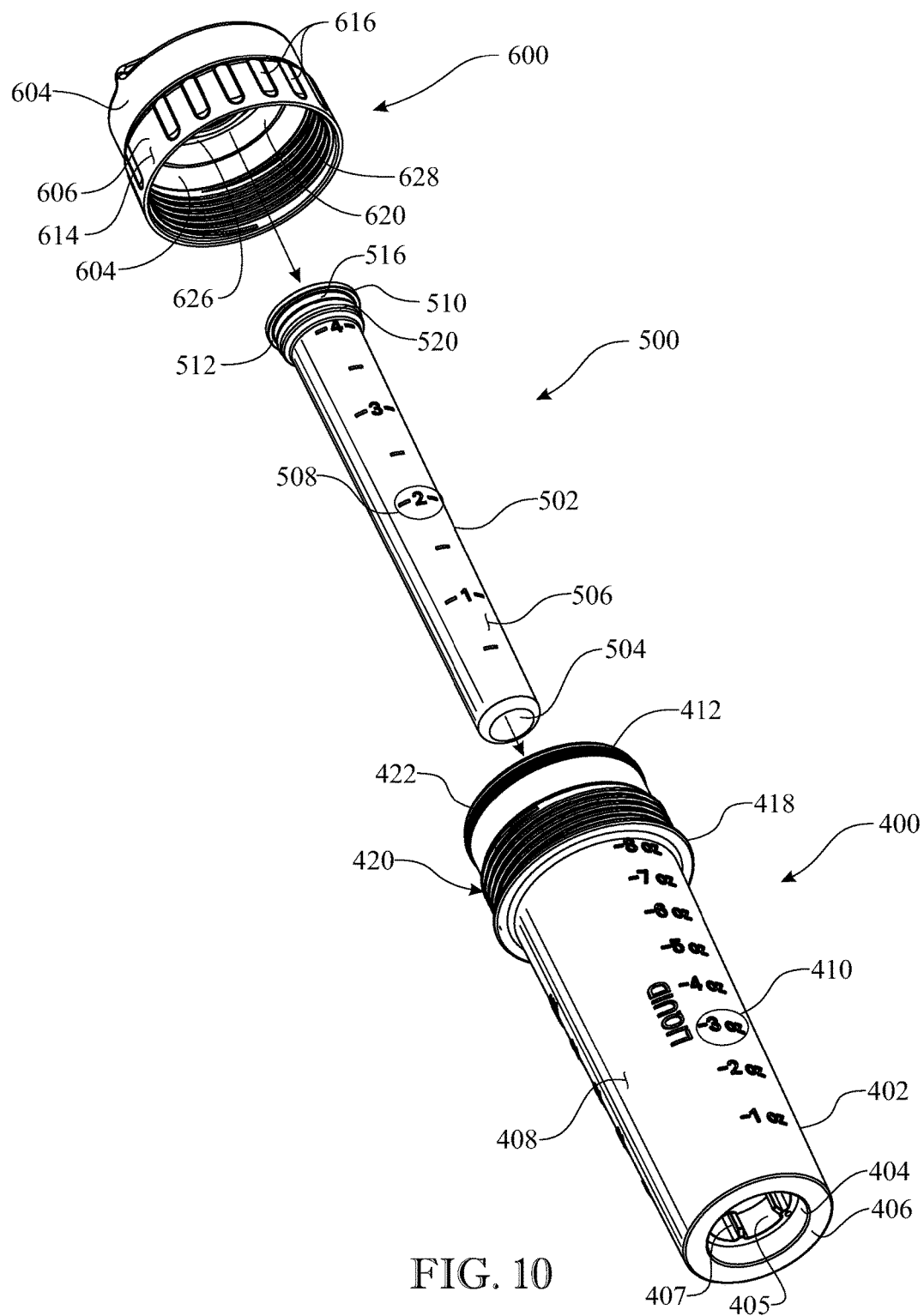
FIG. 10 presents a bottom isometric exploded view of the exemplary dry formula mixing apparatus introduced in FIG. 8.
Figures 11, 12:
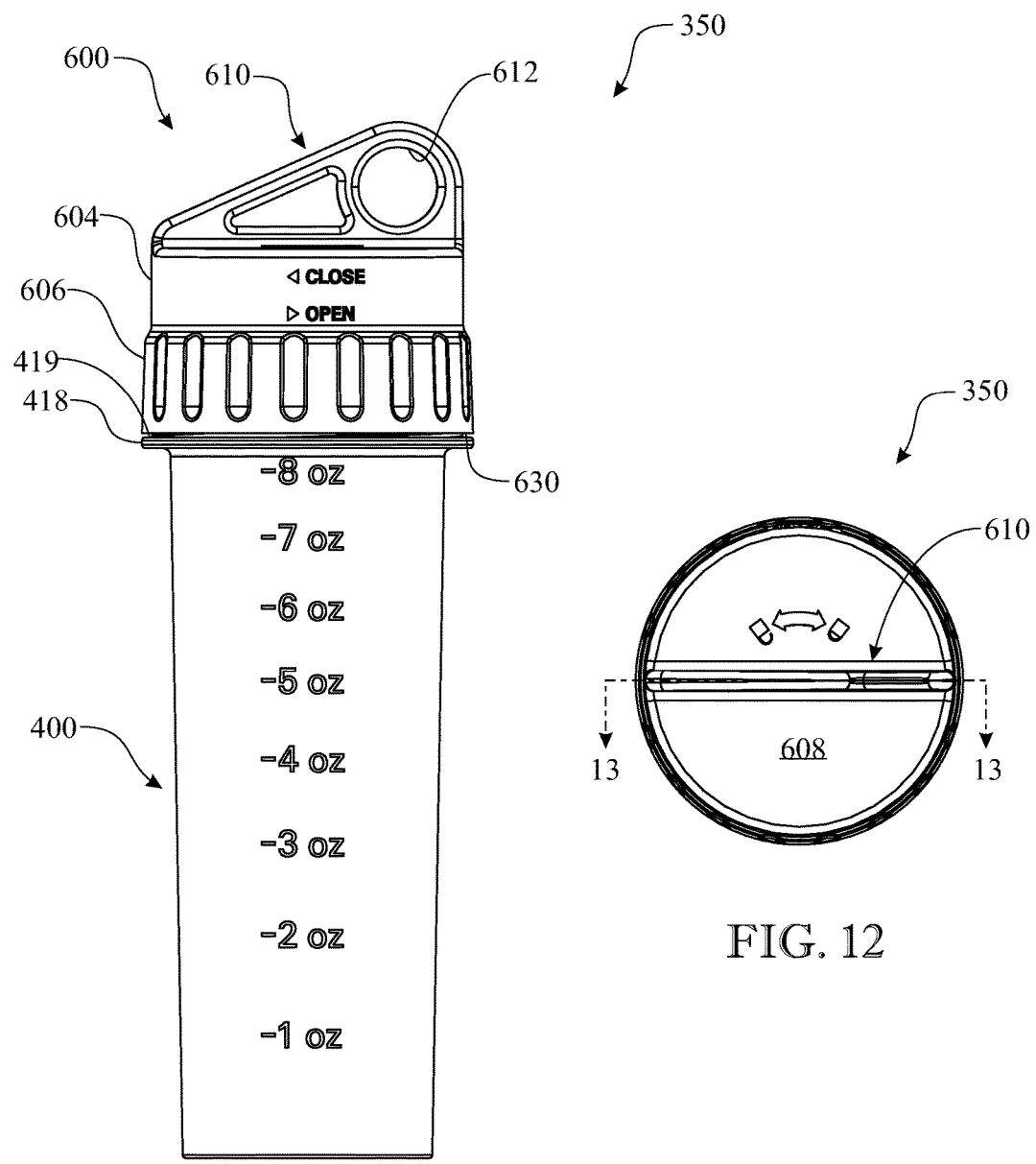
FIG. 11 presents a front elevation view of the apparatus of FIG. 8 in a closed state, isolating the contained liquid from the contained dry formula powder.
FIG. 12 presents a top view of the apparatus of FIG. 11.
Figure 13:
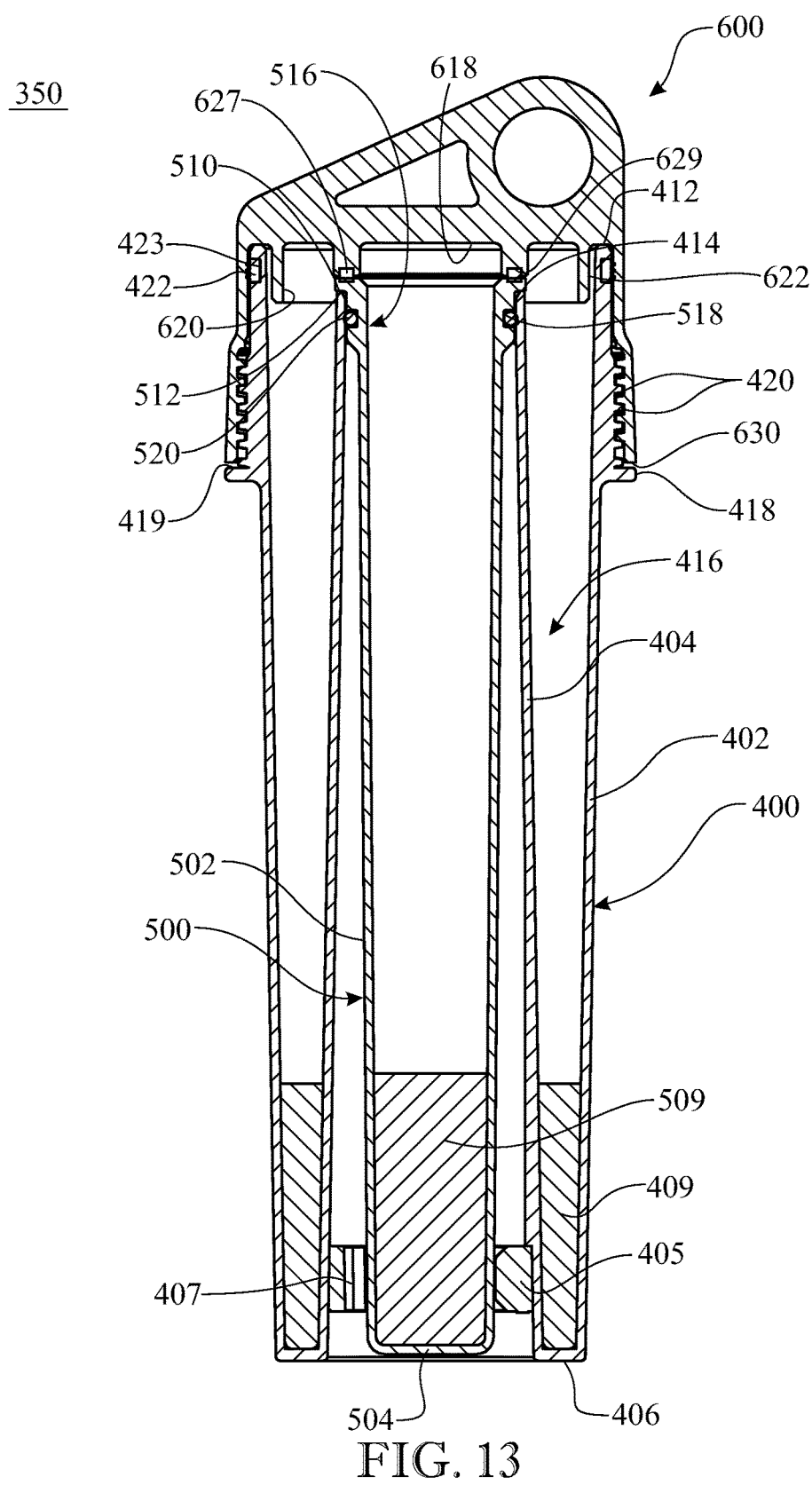
FIG. 13 presents a cross-sectional view taken along section lines 13-13 of FIG. 12.
Figures 14, 15:
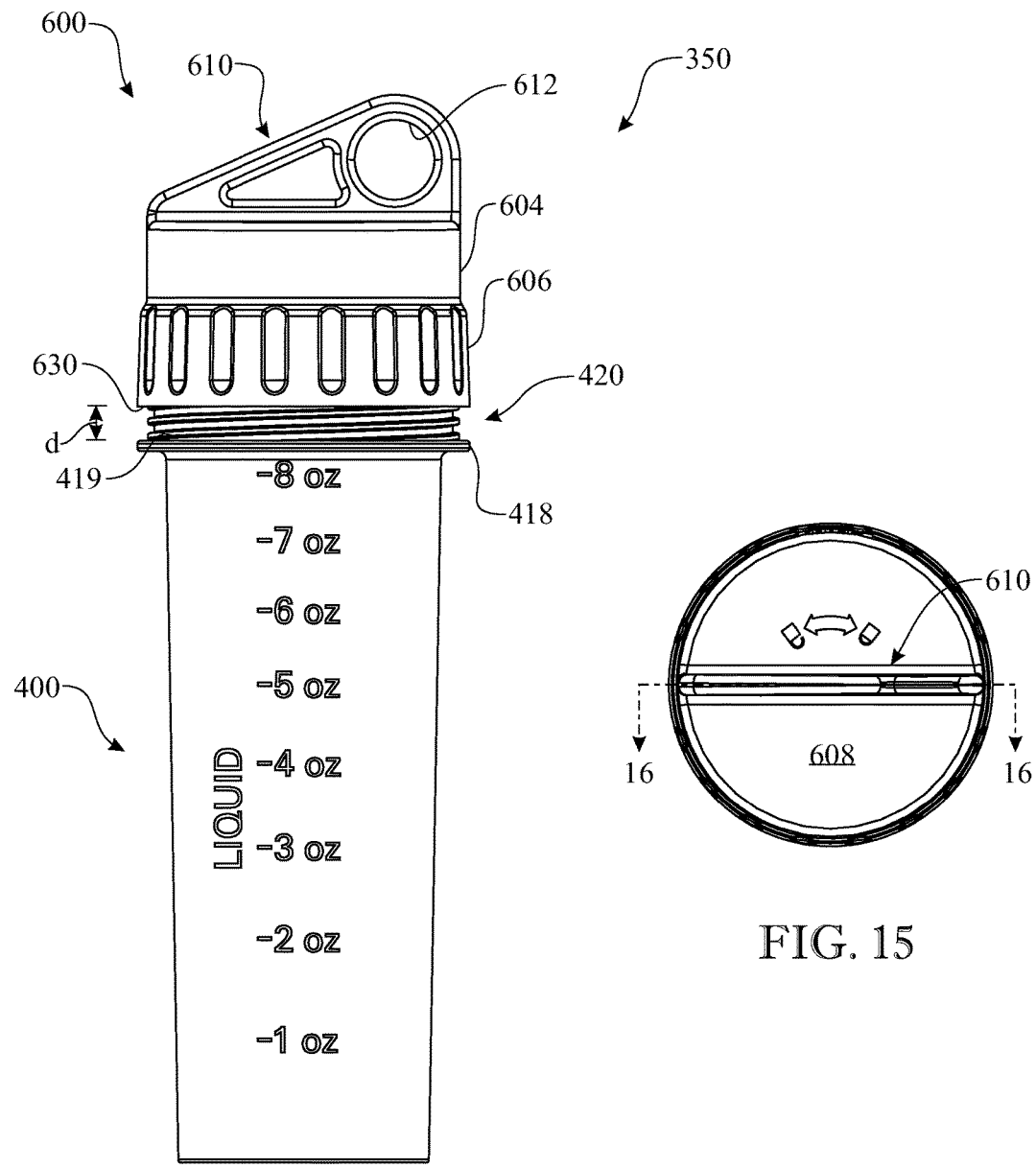
FIG. 14 presents a front elevation view of the apparatus of FIG. 8 in an opened state, facilitating mixing of the liquid and dry formula powder.
FIG. 15 presents a top view of the apparatus of FIG. 14.
Figure 16:
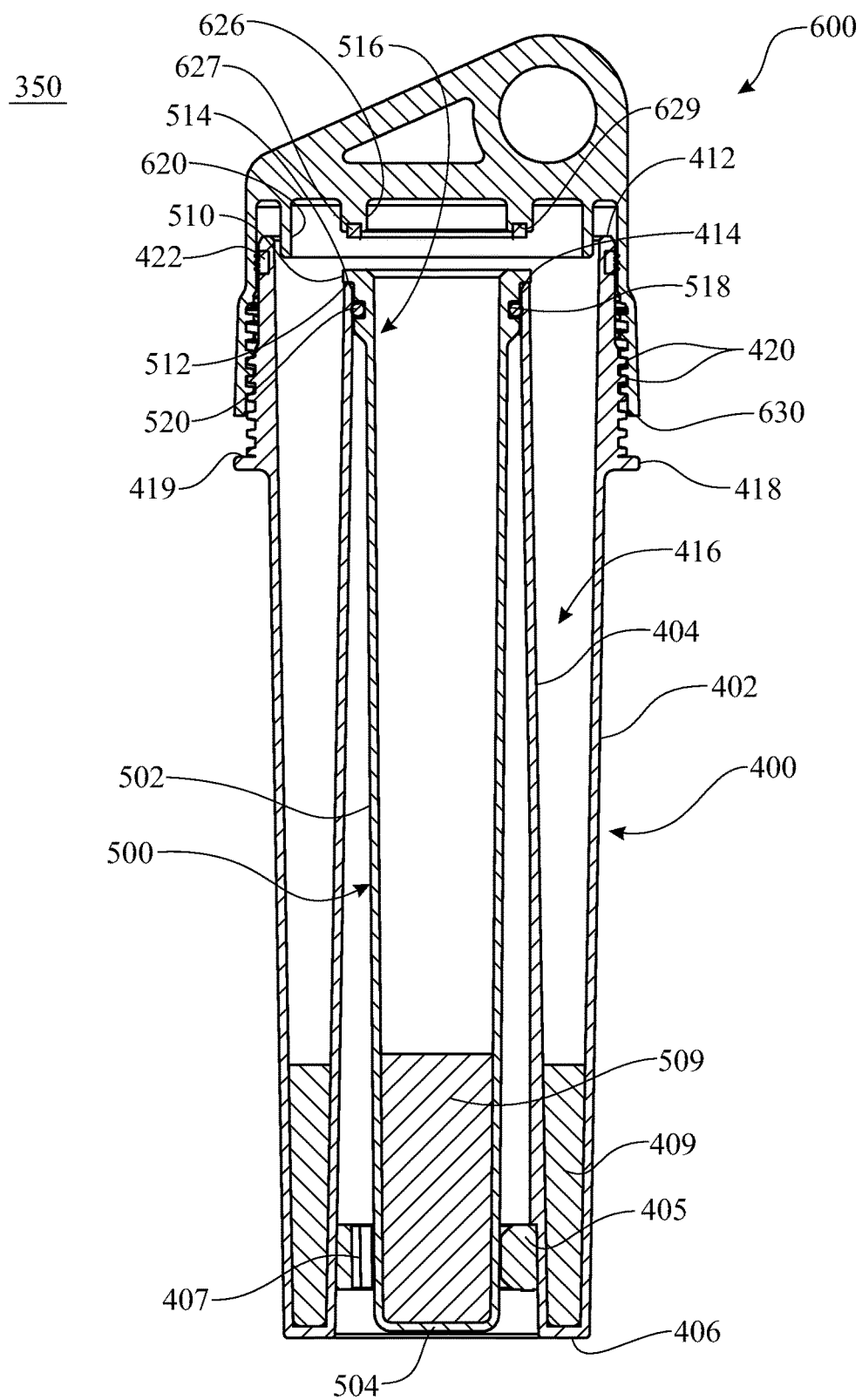
FIG. 16 presents a cross-sectional view taken along section lines 16-16 of FIG. 15.

The dry formula mixing apparatus 100 can be accompanied by a mixing mat 300, whereby an exemplary embodiment of the mixing mat 300 is illustrated in FIG. 7. The mixing mat 300 is fabricated of any water resistant, waterproof, or water repellant material. It is preferably that the mixing mat 300 is fabricated of a flexible material. The mixing mat 300 can be fabricated of rubber, nylon, a laminated material, vinyl, and the like. The mixing mat 300 is fabricated of a planar sheet of material having a mat upper surface 310 and a mat lower surface 312 bounded by a mat peripheral edge 314. A mat general indicia 320 can be disposed upon the mat upper surface 310 of the mixing mat 300, wherein the mat general indicia 320 can be a logo, an instruction set, cooking ingredients, artwork, and the like. A conversion reference 322 can also be disposed upon the mat upper surface 310, wherein the conversion reference 322 provides a variety of conversions, preferably including those respective to cooking. The conversion reference 322 can also include a conversion respective to the volumes of the base container 110 and/or mixing container 140, 240.

In accordance with a second general implementation of the present invention, generally shown in FIGS. 8-16, a dry formula mixing apparatus, generally denoted by reference number 350, is shown in various assembled and disassembled views, as well as in both "opened" and "closed" conditions.

Referring now to FIGS. 8-16, the dry powder mixing apparatus generally includes a liquid (e.g., water) container assembly 400, a powder container assembly 500, and a cap 600. Liquid container 400 includes an outer sidewall 402, an inner sidewall 404, and an annular base 406 joining and contiguous with the sidewalls. A stabilizing ring 405 having inwardly projecting ring fins 407 is provided at a lower end (proximate to annular base 406) of liquid container 400. As described further below, the stabilizer ring 405 and ring fins 407 are used to stabilize a corresponding lower end of a powder container 500 (described below). The cross-sectional thickness of outer sidewall 402 is generally uniform, extending upwardly from annular base 406 to integral flange 418 extending outwardly from and circumscribing exterior surface of liquid container outer sidewall 402. However, the thickness of outer sidewall 402 is preferably increased from an upper surface 419 of flange 417 to an upper edge 412 thereof. A length of external threading 420 is integrated into outer surface 408 of outer sidewall 402 for facilitating rotational twisting or threading engagement with corresponding internal threading 628 of lid 600. A liquid container interior space or volume 416, generally defined by liquid container outer wall 402, inner wall 404 and annular base 406 is used to carry a volume of liquid 409 such as, for example, water. As best shown in FIGS. 8-11 and 14, liquid measurement markings, indicia and the like, such as, for example, the 3 ounce (3 oz.) water volume level identified by reference numeral 410, are preferably provided in a clearly visible manner, along outer sidewall 402. Although shown disposed on the outer surface 408 of outer sidewall 402, it will be apparent to those skilled in the art that such indicial may be provided in any manner as long as they are externally visible to a user. Inner sidewall 404 of liquid container 400 preferably incorporates a uniform thickness for a length extending upwardly from contiguous annular base 406 to upper edge 414 of inner sidewall 404. A recess 423 provided in exterior surface 408 of outer sidewall 402 for carrying, or having seated therein, a resilient liquid container external seal 422 circumscribing exterior surface 408 of outer sidewall 402 proximate to upper edge 412. As further described below, while tightening lid 600 onto liquid container 400 resilient liquid seal 422 provides a liquid tight seal against an interior surface of lid upper sidewall portion 604 to effectively prevent undesirable egress (e.g., via leaking) of liquid 409 to an exterior environment.

As best depicted in FIGS. 9, 10, 13 and 16, a powder container 500 having a cylindrical sidewall 502 extending upwardly from contiguous powder container base 504 is provided for carrying a volume of powder 509 such as, for example, dry infant/baby formula. Exterior surface 506 of sidewall 502 of powder container 500 is preferably provided having powder volume measurement markings 508, for example, the 2 scoops indicia and level marking identified by reference numeral 508, in a clearly visible manner, along sidewall 402. Although shown disposed on the outer surface 408 of outer sidewall 402, it will be apparent to those skilled in the art that such indicia may be provided in any manner as long as they are externally visible to a user. Powder container 500 has a thickened upper portion 516 of sidewall 502, which terminates at an outwardly-flanged upper end 510 having a lower surface 512 and an upper surface 514. A contiguous exterior recess 518 is provided completely circumscribing thickened upper portion 516. A resilient powder container external seal 520 is provided seated in recess 518. In a fully assembled state, lower surface 512 of flange 510 rests upon upper edge 414 of liquid container inner sidewall 404, while powder container seal 520 frictionally engages the interior surface of the inner sidewall 404, thereby preventing seepage of liquid, dry powder, or a mixture thereof, into the space between liquid container inner sidewall 404 and powder container sidewall 502, regardless of whether the assembly is in a closed condition/state or an opened (e.g., during mixing) condition/state.

Referring now generally to FIGS. 8-16, and best depicted in FIGS. 19-10, 14 and 16, lid 600 includes a top portion 602 having a sidewall depending downwardly therefrom and contiguous with a perimeter of thereof. More specifically, the lid sidewall includes an upper sidewall portion 604 transitioning into a lower sidewall portion 606 via an outwardly flaring transition portion 605, finally terminating at bottom edge 630 of the aforementioned lower sidewall portion. A dual purpose hand grip-enhancing and carabiner attachment feature, shown generally as reference numeral 610, is provided as a generally vertical wall extending upwardly from and contiguous with an upper exterior surface 608 of lid top portion 602. An upper edge of feature 610 preferable has a downward taper and includes a carabiner aperture 612 extending therethrough.

An exterior surface 614 of lower sidewall portion 606 of lid 600 preferably incorporates grip-enhancing indentations to assist a user with rotating the lid. An outer circular vertical wall 620 extends downwardly from, and is contiguous with, a lower interior surface 618 of top portion 602 of lid 600. Outer circular vertical wall 620 has an exterior surface 622 (FIG. 13), defining a slot 624 between upper sidewall portion 604 of lid 600 and outer circular vertical wall 620. An inner circular vertical wall 626 extends downwardly from, and is contiguous with, lower interior surface 618 of top portion 602 of lid 600. A recess 629 provided in a lower edge of inner circular vertical wall 626 is provided having a resilient lid inner circular wall seal seated therein, which sealingly engages upper surface 514 of flange 510 of powder container 500 when lid 600 is in a completely tightened closed state/condition, effectively functioning to prevent any egress of powder volume 509 from containment within powder container 500.

Since many modifications, variations, and changes in detail can be made to the described embodiments and implementation of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A dry formula mixing apparatus, comprising:
a liquid container having an outer cylindrical sidewall and a spaced-apart inner cylindrical sidewall interconnected by, and contiguous with, an annular base, the contiguous inner and outer sidewalls and annular base defining a liquid container interior chamber adapted for receiving a volume of liquid, the liquid container outer sidewall having a thickened upper portion commencing at an outwardly extending flange, the flange transitioning upwardly into an externally threaded portion on the thickened upper portion, and the externally threaded portion transitioning upwardly into an uppermost section of the thickened upper portion terminating at an outer cylindrical sidewall upper edge, the uppermost section of the thickened upper portion having a sealing member integrated therewith;
a stabilizing feature located within an interior space defined by an interior surface of the liquid container cylindrical inner sidewall;
a powder container having a cylindrical sidewall extending upward from, and contiguous with, a powder container base, the contiguous cylindrical sidewall and powder container base defining a powder container interior chamber adapted for receiving a volume of powder, the powder container in snug engagement with the stabilizing feature to aid in maintaining a preferred fixed position and orientation of the powder container within an interior space bounded by said liquid container inner sidewall, an upper length of the powder container having a thickened sidewall portion terminating at a flanged upper end, the flanged upper end supported upon an upper edge of the liquid container cylindrical inner sidewall, and an outer surface of the thickened sidewall portion incorporating a sealing member creating sealing engagement with an opposing surface of the liquid container cylindrical inner sidewall; and
a generally cylindrically-shaped lid having a top portion contiguous with a main lid sidewall depending downwardly from a perimeter thereof, the main lid sidewall having an upper sidewall portion transitioning into a wider lower sidewall portion, the lower sidewall portion terminating at a main lid sidewall lower edge and having an internally threaded surface for selective threading engagement with the externally threaded portion of the liquid container, a bottom interior surface of the top portion of the lid having a first inner cylindrical lid wall contiguous with, and depending downwardly from, said bottom interior lid surface, and the bottom interior surface of the top portion of the lid having a second inner cylindrical lid wall contiguous with, and extending downwardly from, said bottom interior lid surface, the first inner cylindrical lid wall inwardly offset from the upper portion of the main lid sidewall by a distance defining a gap therebetween, the gap sized and shaped for receiving said uppermost section of the thickened portion of said liquid container outer sidewall therein for facilitating selective sealing engagement of an interior surface of the upper portion of the main lid sidewall and the sealing member integrated with the uppermost section of the thickened portion of the liquid container outer sidewall, the second inner cylindrical lid wall inwardly offset from the first inner cylindrical lid wall and terminating at a second inner cylindrical wall lower edge, the lower edge incorporating a sealing member for providing selective sealing engagement with an upper surface of the powder container flange when said mixing apparatus is in a completely closed state.

2. A dry formula mixing apparatus as recited in claim 1, further comprising a combination hand grip and carabiner extending medially upward from an upper surface of said lid.

3. A dry formula mixing apparatus as recited in claim 2, wherein said combination hand grip and carabiner further comprises a vertical wall contiguous with said lid upper surface, said wall having an upper edge having a linear taper from a low point to a high point, said vertical wall having a carabiner aperture extending therethrough.

4. A dry formula mixing apparatus as recited in claim 1, wherein said lower sidewall portion of said lid has hand grip enhancing indentations provided in an exterior surface thereof.

5. A dry formula mixing apparatus as recited in claim 1, wherein said stabilizing feature is located proximate to a lower end of said liquid container and extends inwardly from an interior-facing surface of said cylindrical inner wall.

6. A dry formula mixing apparatus as recited in claim 5, wherein said stabilizing feature further comprises:
a stabilizer ring extending inwardly from the interior-facing surface of said liquid container inner sidewall; and
a plurality of ring fins projecting inwardly from an exposed interior surface of said stabilizer ring.

7. A dry formula mixing apparatus as recited in claim 1, wherein the sealing member integrated with the uppermost section of the thickened portion of said liquid container sidewall further comprises a contiguous recess extending into and circumscribing an exterior surface of the uppermost section of the thickened portion of said liquid container, and a resilient seal snugly seated within said contiguous recess, wherein said resilient seal isolates liquid within said liquid container interior chamber from egress outside of said apparatus regardless of whether said lid is in an open or closed state.

8. A dry formula mixing apparatus as recited in claim 1, wherein the sealing member that is incorporated into the outer surface of the thickened sidewall portion of the powder container further comprises a contiguous recess extending into and circumscribing an outer surface of the thickened powder container sidewall portion, and a resilient seal snugly seated within said recess, wherein said resilient seal prevents ingress of both liquid and dry powder into an interior space between said liquid container and said dry powder container of said apparatus regardless of whether said lid is in an open or closed state.

9. A dry formula mixing apparatus as recited in claim 1, wherein said sealing member incorporated with said second inner cylindrical lid wall lower edge further comprises a contiguous recess extending into and circumscribing an exterior surface of said second inner cylindrical lid wall, and a resilient seal snugly seated within said contiguous recess, wherein said resilient seal prevents egress of liquid contained within said liquid container and egress of powder contained within said powder container, while said lid is in a closed state, but facilitates egress of liquid contained within said liquid container and egress of powder contained within said powder container, thereby facilitating mixing of said liquid and said powder while said lid is in an opened state.

10. A dry formula mixing apparatus as recited in claim 1, further comprising visible liquid volume measurement level markings and corresponding indicia disposed upon an exterior surface of said outer cylindrical sidewall of said liquid container.

11. A dry formula mixing apparatus as recited in claim 10, further comprising visible indicia in the form of a chart displaying a list of ratios of powder volume to liquid volume, disposed upon an exterior surface of said outer cylindrical sidewall of said liquid container.

12. A dry formula mixing apparatus as recited in claim 1, further comprising visible powder volume measurement level markings and corresponding indicia disposed upon an exterior surface of said cylindrical sidewall of said powder container.

13. A dry formula mixing apparatus as recited in claim 1, wherein said inner and outer cylindrical sidewalls of said liquid container diverge in an upward direction from said annular base.

14. A dry formula mixing apparatus as recited in claim 1, wherein when said apparatus is in a fully assembled state, said outer cylindrical sidewall of said liquid container, said cylindrical sidewall of said powder container, and said cylindrical sidewall of said lid are all concentric about a common central axis.

15. A dry formula mixing apparatus as recited in claim 1, wherein said liquid container external threads and said lid internal threads are configured such that clockwise rotation of said lid about said liquid container effects biasing of said apparatus into a closed state, and counter-clockwise rotation of said lid about said liquid container effects biasing of said apparatus into an opened state for mixing.

16. A dry formula mixing apparatus as recited in claim 1, further comprising an indicator integrated into said apparatus for displaying a clearly identifiable indication when said lid has been adequately rotated to ensure mixing communication between liquid in the liquid container and powder in the powder container.

17. A dry formula mixing apparatus as recited in claim 1, wherein said outwardly extending flange of said liquid container outer sidewall thickened upper portion functions as a mechanical stop to prevent excessive rotational tightening of the cylindrically-shaped lid when attempting to attach said lid to said liquid container.

* * * * *